(12) United States Patent
Schacher

(10) Patent No.: US 6,742,543 B2
(45) Date of Patent: Jun. 1, 2004

(54) METHOD AND APPARATUS FOR REDUCING OPERATING COSTS AND EMISSIONS IN A PUMPING INSTALLATION

(75) Inventor: Galen Schacher, Bawlf (CA)

(73) Assignee: Trinity Innovations, Inc., Bawlf (CA)

( * ) Notice: Subject to any disclaimer, the term of this patent is extended or adjusted under 35 U.S.C. 154(b) by 0 days.

(21) Appl. No.: 09/875,354

(22) Filed: Jun. 6, 2001

(65) Prior Publication Data

US 2001/0050109 A1 Dec. 13, 2001

(30) Foreign Application Priority Data

Jun. 12, 2000 (CA) .......................................... 2,311,219

(51) Int. Cl.[7] .............................................. F16K 11/10
(52) U.S. Cl. ....................................... 137/883; 137/879
(58) Field of Search ................................ 137/879, 883, 137/901

(56) References Cited

U.S. PATENT DOCUMENTS

| | | | | |
|---|---|---|---|---|
| 3,552,436 A | * | 1/1971 | Stewart | 137/883 |
| 3,928,711 A | * | 12/1975 | Jakobsen | 174/11 R |
| 4,120,319 A | * | 10/1978 | Krechel et al. | 137/583 |
| 4,121,601 A | | 10/1978 | Presley | 137/101 |
| 4,140,196 A | | 2/1979 | Brewer | 180/44 F |
| 4,477,234 A | | 10/1984 | Roeder | 417/393 |
| 4,516,917 A | | 5/1985 | Canalizo | 417/390 |
| 4,609,074 A | * | 9/1986 | Berrend | 184/81 |
| 4,644,972 A | * | 2/1987 | Perrott | 137/883 |
| 5,104,296 A | | 4/1992 | Roeder | 417/403 |
| 5,159,957 A | * | 11/1992 | Hehl | 137/883 |
| 5,303,733 A | * | 4/1994 | Nelson | 137/505.38 |
| 5,497,832 A | | 3/1996 | Stuebinger et al. | 166/369 |
| 5,797,452 A | | 8/1998 | Martin | 166/110 |
| 5,810,115 A | * | 9/1998 | Mismas | 184/7.4 |

* cited by examiner

*Primary Examiner*—John Fox
(74) *Attorney, Agent, or Firm*—Davis & Bujold, PLLC

(57) ABSTRACT

A method and apparatus for reducing operating costs and emissions in a pumping installation. A first step involves providing a flow dividing apparatus capable of dividing flow from a pump. The apparatus has a single inlet and two or more outlets. A second step involves coupling the flow dividing apparatus with a pump of the pumping installation and directing flow from the pump through the single inlet of the flow dividing apparatus. The pump will generate a flow stream from each of the two or more outlets and perform work that, in the absence of the flow dividing apparatus, would have to be performed by two or more pumps. The reduction in the number of pumps used necessarily reduces both operating costs and emissions.

3 Claims, 4 Drawing Sheets

METHOD AND APPARATUS FOR REDUCING OPERATING COSTS AND EMISSIONS IN A PUMPING INSTALLATION

FIELD OF THE INVENTION

The present invention relates to a method and an apparatus for reducing operating costs and emissions in a pumping installation

BACKGROUND OF THE INVENTION

There are numerous pumping installations in which multiple pumps are used to convey liquids. An example of such an installation is a methanol injection pumping installation associated with natural gas production facilities. As natural gas flows through piping, water vapour in the natural gas tends to condense and freeze, forming ice plugs in the piping. In order to prevent these ice plugs from forming, methanol is injected into areas of the piping that have been identified as being prone to the development of ice plugs. Each methanol injection pumping installation has a minimum of two pumps that inject methanol.

A factor in the economic viability of these pumping installations is rising operating costs relating to the operation and maintenance of the pumps. A further factor is the cost of complying with environmental standards relating to emissions from the pumps, as stricter environmental regulations are introduced.

SUMMARY OF THE INVENTION

What is required is a method and an apparatus for reducing operating costs and emissions in a pumping installation.

According to one aspect of the present invention there is provided a method for reducing operating costs and emissions in a pumping installation. A first step involves providing a flow dividing apparatus capable of dividing flow from a pump. The apparatus has a single inlet and two or more outlets. A second step involves coupling the flow dividing apparatus with a pump of the pumping installation and directing flow from the pump through the single inlet of the flow dividing apparatus. The pump will generate a flow stream from each of the two or more outlets and perform work that, in the absence of the flow dividing apparatus, would have to be performed by two or more pumps.

With the method, as described above, a single pump performs the work that is normally performed by two or more pumps. During proto-type testing a single pump was used in a methanol injection pumping installation to do work formerly performed by two pumps. The installation reduced both operating costs and emissions by more than 50%. Not only was a single pump doing the work of two, but the single pump was operating in a more efficient output range.

According to another aspect of the present invention there is provided an apparatus for reducing operating costs and emissions in a pumping installation. The apparatus includes a body having a single inlet and two or more outlets. Means are provided for coupling an input conduit from a pump to the single inlet. Means are provided for coupling an output conduit to each of the two or more outlets.

Although beneficial results may be obtained through the use of the apparatus, as described above, when a single pump is performing the work of two or more pumps, the flow rate for each application may not necessarily be equal. The relative flow output through the two outlets can be made unequal by adjusting the relative size of the passages. However, even more beneficial results may be obtained when means is provided to alter relative flow output through the two or more outlets.

There are various ways in which flow through the outlets can be altered and various valve configurations that can achieve the desired result. Beneficial results have been obtained through the use of a ball valve having a ball and seat. A compression spring is provided for exerting a biasing force upon the ball to maintain the ball engaged with the seat until a predetermined pump pressure is exerted to overcome the biasing force and permit the ball to be displaced. Some means must be provided for increasing and decreasing the biasing force exerted by the compression spring upon the ball. A preferred means for increasing and decreasing the biasing force is a rotatable pressure member extending into the body which acts upon the compression spring. Rotation of the rotatable pressure member in a first rotational direction extends the pressure member further into the body to increase the compressive force upon the compression spring. Rotation of the rotatable pressure member in a second rotational direction partially retracts the pressure member out of the body to decrease the compressive force upon the compression spring.

There are various ways in which the internal structure of the body can be configured to enable flow through the single inlet to be divided between two or more outlets. A configuration that has provided beneficial results and accommodated valving includes providing the inlet with an inlet passage that extends into the body. Each of the two or more outlets has a connective passage that extends through the body to communicate with the inlet passage, and a discharge passage that branches off from the connective passage.

Although beneficial results may be obtained through the use of the apparatus, as described above, the ability to alter relative flow output cannot be fully utilized unless the result of changes to relative flow output can be determined. In the absence of an indication as to relative flow output, relative adjustments become merely guesswork. Even more beneficial may, therefore, be obtained when means are provided to determine relative flow output through the two or more outlets. A convenient means for determining relative flow output has proven to be a pressure gauge on each of the two or more outlets that measures flow output pressure.

It is preferred that a pressure gauge also be placed on the single inlet that measures flow input pressure. This enables pump output pressure entering the single inlet to be monitored.

BRIEF DESCRIPTION OF THE DRAWINGS

These and other features of the invention will become more apparent from the following description in which reference is made to the appended drawings, the drawings are for the purpose of illustration only and are not intended to in any way limit the scope of the invention to the particular embodiment or embodiments shown, wherein.

DETAILED DESCRIPTION OF THE PREFERRED EMBODIMENT

Figure 1:
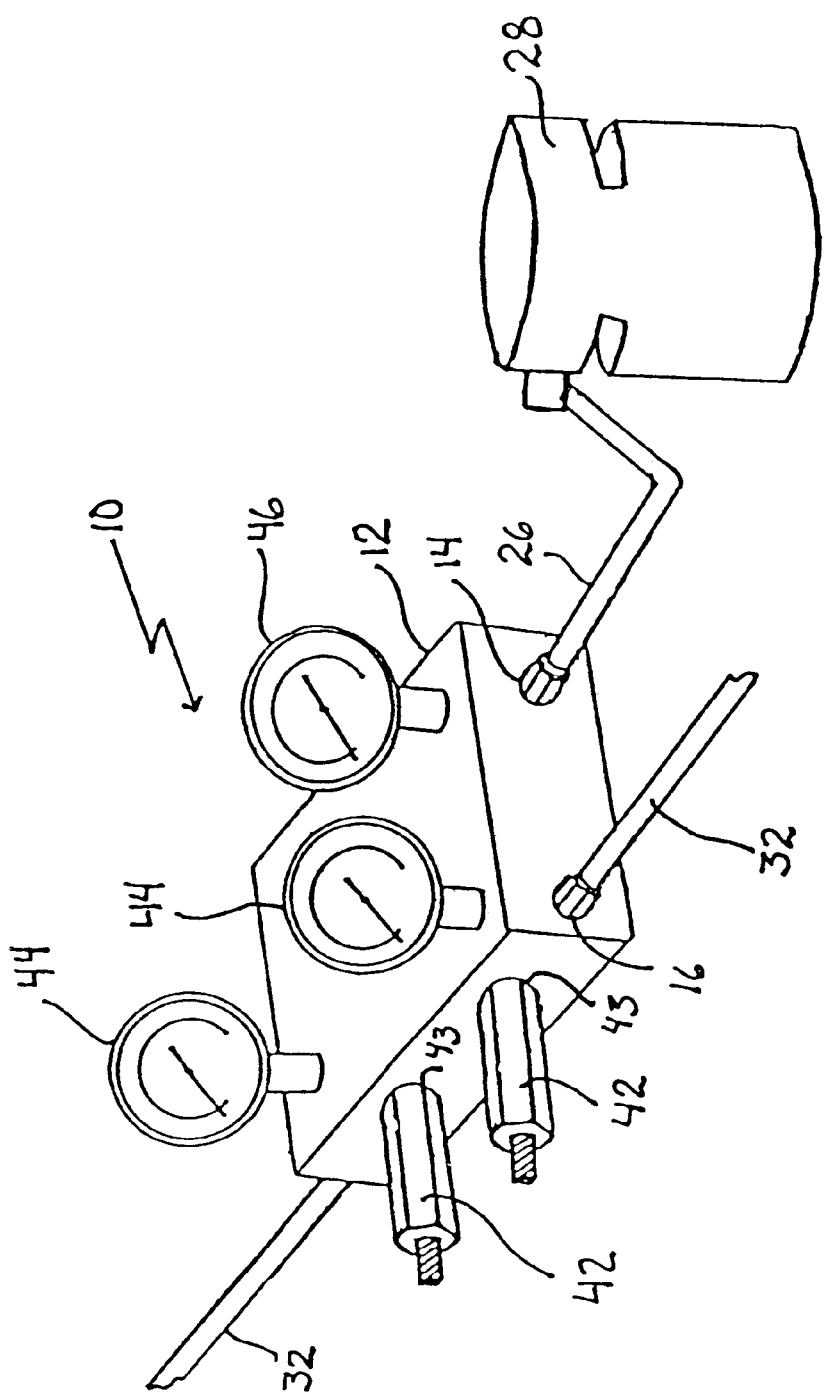
FIG. 1 is a perspective view of a flow dividing apparatus for reducing operating costs and emissions in a pumping installation, constructed in accordance with the teachings of the present invention.

The preferred embodiment, a flow dividing apparatus for reducing operating costs and emissions in a pumping installation generally identified by reference numeral 10, will now be described with reference to FIGS. 1 through 4.

Structure and Relationship of Parts

Figure 2:
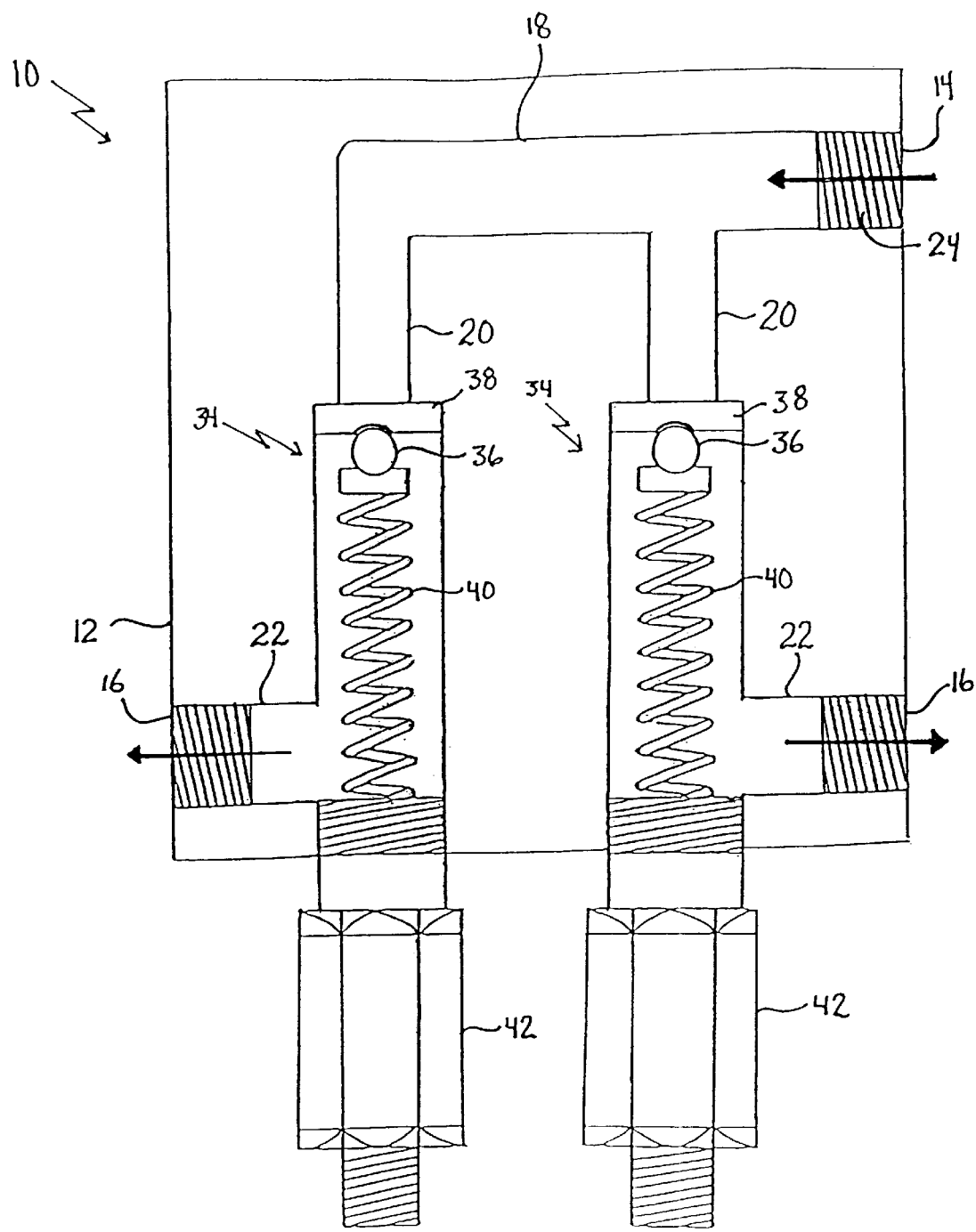
FIG. 2 is top plan view, in section, of the flow dividing apparatus illustrated in FIG. 1.

Referring to FIG. 2, flow dividing apparatus 10 includes a body 12 having a single inlet 14, and at least two outlets 16. Single inlet 14 has an inlet passage 18 that extends into body 12. Each of outlets 16 have a connective passage 20 that extends through body 12 and communicates with inlet passage 18. Each of outlets 16 also have a discharge passage 22 that branches off from connective passage 20.

Single inlet 14 has threaded inlet coupling 24 as illustrated in FIG. 2. Threaded inlet coupling 24 permits an input conduit 26 from a pump 28 to be coupled to single inlet 14 as illustrated in FIG. 1.

Each of outlets 16 have threaded outlet couplings 30 as illustrated in FIG. 2. Threaded outlet couplings 30 permit an output conduit 32 to be coupled to each of outlets 16 as illustrated in FIG. 1.

Referring to FIG. 2, a ball valve generally referenced by numeral 34, is positioned in each of connective passages 20. Ball valve 34 has a ball 36 and seat 38. A compression spring 40 positioned in connective passage 20 exerts a biasing force upon ball 34 to maintain ball 34 engaged with seat 38 until a predetermined pump pressure is exerted to overcome the biasing force and permit ball 34 to be displaced.

Referring to FIG. 2, a rotatable pressure member 42 is positioned in each of two pressure member receiving apertures 43 in body 12. Rotatable pressure members 42 extend into each of connective passages 20 and act upon compression spring 40. Rotation of rotatable pressure member 42 in a first rotational direction extends pressure member 42 further into connective passage 20 to increase the compressive force upon compression spring 40 while rotation of rotatable pressure member 42 in a second rotational direction partially retracts pressure member 42 out of connective passage 20 to decrease the compressive force upon compression spring 40. Adjustment of rotatable pressure members 42 in each of connective passages 20 alters the relative flow output through outlets 16.

Figure 3:
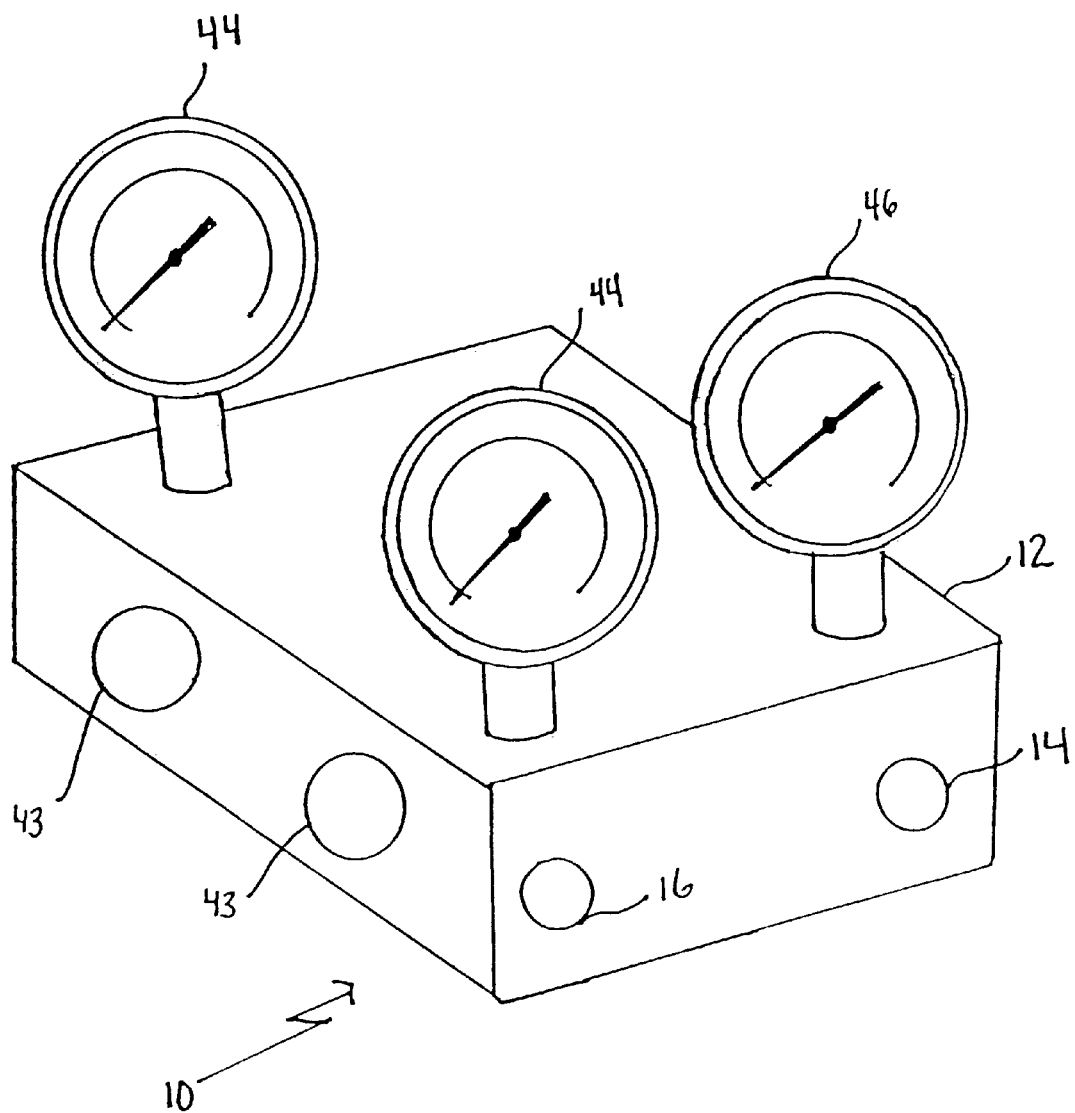
FIG. 3 is a front perspective view of the flow dividing apparatus illustrated in FIG. 1, with rotatable pressure members removed.
Figure 4:
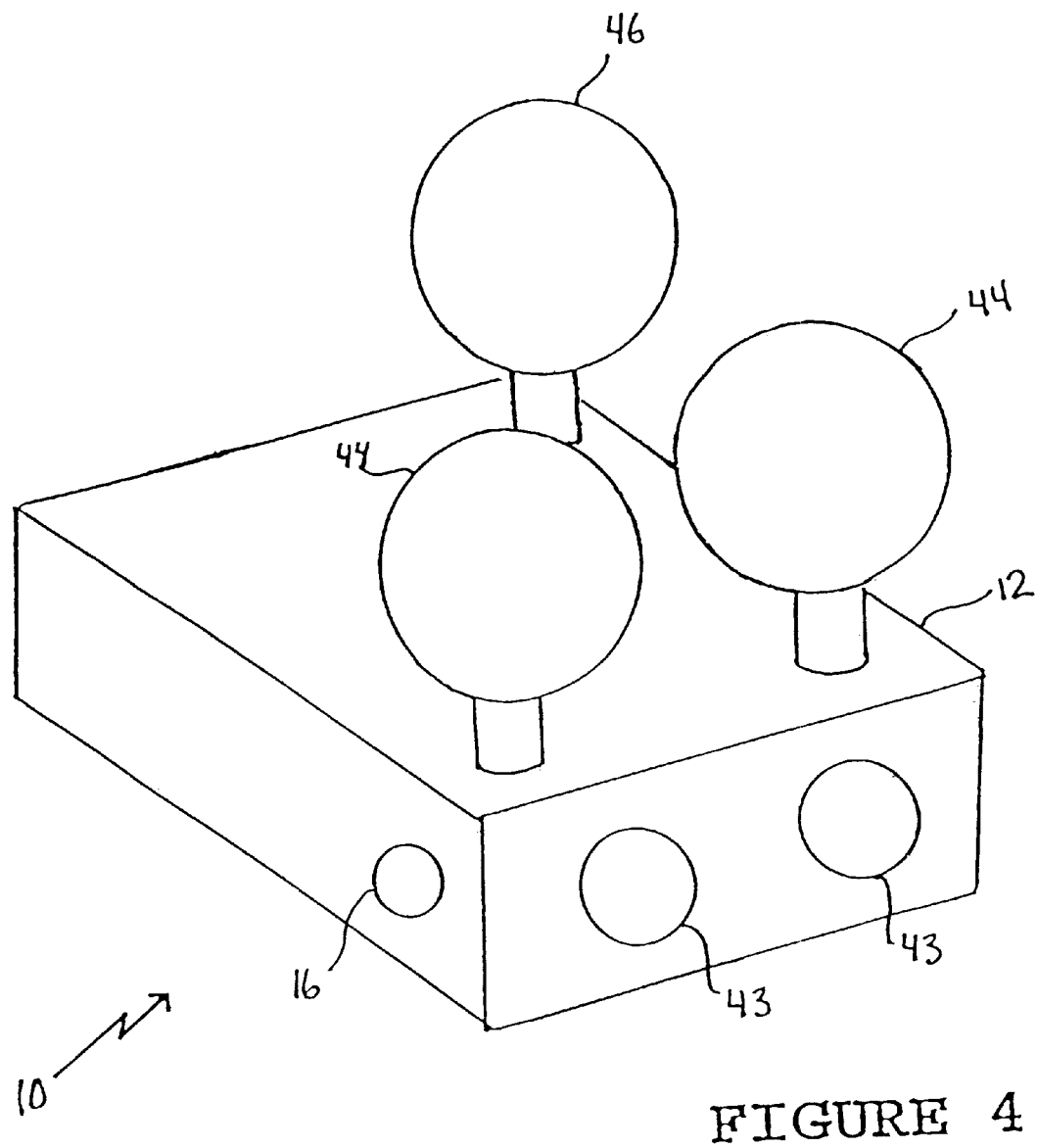
FIG. 4 is a rear perspective view of the flow dividing apparatus illustrated in FIG. 1, with rotatable pressure members removed.

Referring to FIGS. 3 and 4, a pressure gauge 44 is positioned on each of outlets 16 whereby the relative flow output pressure is determined. A pressure gauge 46 is also provided on single inlet 14 to determine flow input pressure through single inlet 14.

Operation

The use and operation of flow dividing apparatus 10 will now be described with reference to FIGS. 1 through 4.

When it is desired to have a single pump perform the work that is normally performed by two or more pumps, the first step is providing a flow dividing apparatus 10 capable of dividing flow stream as illustrated in FIG. 2.

A second step involves coupling apparatus 10 with pump 28 of a pumping installation as illustrated in FIG. 1. Pump 28 will generate a flow stream through input conduit 26 and into inlet 14 of body 12 of apparatus 10. Flow stream then flows along inlet passage 18 and into connective passages 20 before passing through ball valve 34 and exiting body 12 into output conduits 32 attached to each of outlets 16.

Referring to FIGS. 3 and 4, relative flow input can be monitored by pressure gauge 46 positioned on inlet 14. Relative flow output pressure can be determined by pressure gauges 44 positioned on each of outlets 16.

Referring to FIG. 2, rotation of rotatable pressure members 42 in a first rotational direction extends pressure member 42 further into connective passage 20 to increase the compressive force upon compression spring 40 while rotation of rotatable pressure members 42 in a second rotational direction partially retracts pressure members 42 out of connective passage 20 to decrease the compressive force upon compression spring 40. Adjustment of rotatable pressure members 42 in each of connective passages 20 alters the relative flow output through outlets 16.

In this manner, apparatus 10 allows a pump 28 to generate a flow stream from both of outlets 16 and perform work that, in the absence of apparatus 10, would have to be performed by two or more pumps 28.

Variations and Alternative Embodiments

Although the illustrated embodiment has two outlets, it will be apparent to one skilled in the art that three or more outlets can be provided by enlarging the body and positioning additional connective passages on the opposite side of the inlet passage.

Cautionary Warnings

The pump output pressure entering the single inlet should always be greater that the highest discharge pressure of the two or more outlets.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope of the invention as hereinafter defined in the Claims.

The embodiments of the invention in which an exclusive property or privilege is claimed are defined as follows:

1. An apparatus for reducing operating costs and emissions in a pumping installation, comprising:

a body having a single inlet and at least two outlets, the single inlet has an inlet passage that extends into the body, the inlet passage continuously communicates simultaneously with each of at least two connective passages, the connective passages extend through the body and communicate with a discharge passage that branches off from the connective passage;

a threaded inlet coupling on the single inlet whereby an input conduit from a pump is coupled to the single inlet;

threaded outlet couplings on each of the at least two outlets whereby an output conduit is coupled to each of the at least two outlets;

a ball valve positioned in each of the connective passages, the ball valve has a ball and seat, a compression spring positioned in the connective passage exerts a biassing force upon the ball to maintain the ball engaged with the seat until a predetermined pump pressure is exerted to overcome the biasing force and permit the ball to be displaced;

an externally accessible rotatable pressure member extends into each of the connective passages and acts upon the compression spring, rotation of the rotatable pressure member in a first rotational direction extends the pressure member further into the connective passage to increase the compressive force upon the compression spring, rotation of the rotatable pressure member in a second rotational direction partially retracts the pressure member out of the connective passage to decrease the compressive force upon the compression spring, such that adjustment of the rotatable pressure members in each of the connective passages alters relative flow output through the at least two outlets; and a pressure gauge positioned on each of the at least two outlets whereby relative flow output pressure is determined.

2. The apparatus as defined in claim 1, wherein a pressure gauge is provided on the single inlet to determine flow input pressure through the single inlet.

3. An apparatus for reducing emissions in a pumping installation, comprising:

a body having a single inlet and only two outlets, the single inlet has an inlet passage that extends into the body, the inlet passage directly continuously communicating in parallel with both of the two connective passages, each of the connective passages extending through the body and communicating with one of the two outlets via a discharge passage;

a threaded inlet coupling facilitating connection of a pump to the single inlet;

each of the two outlets having a threaded outlet coupling for connecting an output conduit thereto;

a ball valve positioned in each of the connective passages, the ball valve has a ball and seat, a compression spring positioned in the connective passage and exerting a biasing force upon the ball to maintain the ball in engagement with the seat until a predetermined pump pressure is exerted on the ball to overcome the biasing force and displace the ball from the ball seat;

an externally accessible rotatable pressure member extending into each of the connective passages and coupled to the compression spring such that rotation of the rotatable pressure member in a first rotational direction threads the pressure member further into the connective passage to increase the compressive force upon the compression spring while rotation of the rotatable pressure member in a second opposite rotational direction retracts the pressure member from the connective passage and decreases the compressive force upon the compression spring whereby adjustment of the rotatable pressure members alters the pressure exerted on the respective ball; and a pressure gauge positioned on each of the respective outlets for displaying an output pressure therein.

* * * * *